(12) United States Patent
Giljohann et al.

(10) Patent No.: US 8,109,807 B2
(45) Date of Patent: Feb. 7, 2012

(54) METHOD AND APPARATUS FOR CLEANING A JET ENGINE

(75) Inventors: Sebastian Giljohann, Darmstadt (DE); Manfred Paul, Nackenheim (DE)

(73) Assignee: Lufthansa Technik AG, Hamburg (DE)

( * ) Notice: Subject to any disclaimer, the term of this patent is extended or adjusted under 35 U.S.C. 154(b) by 264 days.

(21) Appl. No.: 12/433,411

(22) Filed: Apr. 30, 2009

(65) Prior Publication Data

US 2010/0000572 A1    Jan. 7, 2010

(30) Foreign Application Priority Data

Apr. 30, 2008   (DE) .................. 10 2008 021 746

(51) Int. Cl.
   *B24B 41/00*    (2006.01)
(52) U.S. Cl. .......... 451/11; 451/75; 451/91; 451/99
(58) Field of Classification Search ............ 451/7, 40, 451/99, 102, 11, 75, 91
   See application file for complete search history.

(56) References Cited

U.S. PATENT DOCUMENTS

| | | | |
|---|---|---|---|
| 4,065,322 A * | 12/1977 | Langford | 451/39 |
| 4,947,592 A * | 8/1990 | Lloyd et al. | 451/99 |
| 5,011,540 A * | 4/1991 | McDermott | 134/23 |
| 5,123,207 A * | 6/1992 | Gillis et al. | 451/89 |
| 5,445,553 A * | 8/1995 | Cryer et al. | 451/7 |
| 5,632,150 A * | 5/1997 | Henzler | 451/53 |
| 5,785,581 A * | 7/1998 | Settles | 451/99 |
| 6,004,400 A * | 12/1999 | Bishop et al. | 451/102 |
| 7,445,677 B1 * | 11/2008 | Asplund | 134/24 |
| 7,497,220 B2 * | 3/2009 | Asplund et al. | 134/22.1 |
| 7,815,743 B2 * | 10/2010 | Asplund et al. | 134/22.1 |
| 2004/0121711 A1 * | 6/2004 | Opel | 451/75 |

FOREIGN PATENT DOCUMENTS

WO    WO-2005/120953    12/2005

OTHER PUBLICATIONS

"Carbon Dioxide Blasting Operations," located at http://p2library.nfesc.navy.mil/P2_Opportunity_Handbook/5_2.html visited on Apr. 28, 2008; (7 pages).

* cited by examiner

*Primary Examiner* — Maurina Rachuba
(74) *Attorney, Agent, or Firm* — Morrison & Foerster LLP

(57) ABSTRACT

An apparatus for cleaning a jet engine includes a supply device configured to make cleaning medium available, a nozzle device configured to introduce the cleaning medium into the jet engine, and a line connection between the supply device and the nozzle device. The cleaning medium can be solid carbon dioxide. A system including a jet engine and the apparatus. A method for cleaning a jet engine using solid carbon dioxide.

20 Claims, 7 Drawing Sheets

US 8,109,807 B2

METHOD AND APPARATUS FOR CLEANING A JET ENGINE

REFERENCE TO RELATED APPLICATIONS

This application claims the priority of German Patent Application No. 10 2008 021 746.8, filed Apr. 30, 2008, the contents of which are incorporated herein by reference.

FIELD OF THE INVENTION

The invention relates to an apparatus, an arrangement and a method for cleaning an aircraft jet engine.

BACKGROUND OF THE INVENTION

Aircraft jet engines possess in a known way one or more compressor stages, a combustion chamber and also one or more turbine stages. In the turbine stages, the hot combustion gases coming from the combustion chamber discharge part of their thermal and mechanical energy which is utilized in order to drive the compressor stages. Jet engines of commercial aircraft nowadays have most predominantly what is known as a turbofan which is arranged upstream of the compressor stages and, as a rule, has a considerably larger diameter than the compressor stages. The turbofan is likewise driven by the turbine stages and allows a considerable part of the air flowing overall through the engine to flow as what is known as a secondary airstream past the compressor stages, the combustion chamber and the turbine stages. By means of such a secondary stream, the efficiency of an engine can be increased considerably, and, moreover, care can also be taken to ensure an improved noise insulation of the engine.

A contamination of an aircraft jet engine may lead to a reduction in efficiency, thus resulting in an increased fuel consumption and consequently in increased environmental pollution. The contamination may be caused, for example, by insects, dust, salt mist or other environmental impurities. Parts of the engine may be contaminated by combustion residues from the combustion chamber. These impurities form a coating on those parts of an aircraft engine through which air flows, and are detrimental to the surface quality. The thermodynamic efficiency of the engine is consequently impaired. In this case, in particular, mention must be made of the blades in the compressor stages, the contamination of which blades has a considerable influence on the efficiency of the overall engine.

To eliminate impurities, it is known to clean an engine by means of a cleaning liquid, as a rule hot water. WO 2005/120953 discloses an arrangement in which a plurality of cleaning nozzles are arranged upstream of the turbofan or of the compressor stages. The cleaning liquid is then sprayed into the engine. The engine may in this case rotate in what is known as the dry cranking mode, that is to say rotate the blades of the engine, without kerosene being burnt in the combustion chamber. By means of the cleaning liquid introduced into the engine, dirt is to be washed off from the surfaces of the engine components in this way.

Alternatively to the use of water as a cleaning medium, it is known to use coal dust. The coal dust is in this case introduced through nozzles into the engine, in the same way as water, and strips away impurities from surfaces by virtue of abrasive effects. However, the surface of the engine parts is also attacked by the coal dust, and therefore a cleaning medium such as coal dust is not suitable for the regular cleaning of aircraft engines. Moreover, in cleaning with coal dust, undesirable residues of the cleaning material remain behind in the engine.

SUMMARY OF THE INVENTION

The object on which the invention is based is to provide an apparatus, an arrangement and a method which allow an improved cleaning of aircraft engines.

Accordingly, the invention relates to an apparatus for cleaning a jet engine, with a supply device which makes a cleaning medium available, with a nozzle device which is designed for introducing the cleaning medium into the jet engine, and with a line connection between the supply device and the nozzle device, the cleaning medium having solid carbon dioxide or preferably consisting of this.

The invention relates, furthermore, to an arrangement consisting of a jet engine and of an apparatus according to the invention suitable for carrying out a cleaning of the jet engine, the apparatus suitable for carrying out the cleaning of the jet engine being arranged upstream of the turbofan or the compressor stages, such that the nozzles of the apparatus are directed onto the turbofan or the compressor stages.

The invention relates, furthermore, to a method for cleaning a jet engine by means of a cleaning agent, the cleaning agent used being solid carbon dioxide.

The solid carbon dioxide may be provided in the supply device in the form of pellets which are sprayed out of the nozzle device with the aid of a propellant gas. It is also possible, however, to provide liquid carbon dioxide as a precursor of the cleaning medium in the supply device. The liquid carbon dioxide, when it emerges from the nozzle device, solidifies at least partially and forms a solid component in the form of carbon dioxide flakes.

If liquid carbon dioxide comes into contact with ambient air by emerging, for example, through a nozzle, part of it immediately assumes the form of a gas. Another part of the carbon dioxide becomes solid in the form of flakes. This is because that part of the carbon dioxide which is transformed from the liquid to the gaseous state binds to a very great extent heat which is extracted from the other still liquid part, with the result that the temperature of the latter falls to the solidification point of carbon dioxide. The solid carbon dioxide is thus obtained as white snow-like flakes which are held in the air for a relatively long time, specifically independently of the temperature of the air. To be precise, on account of the poor thermal conductivity and very low temperature of solid carbon dioxide, only very slow sublimation takes place. The carbon dioxide constantly escaping in the form of gas from the flakes forms a protective layer around the flakes which, as a rule, prevents direct contact with the solid flakes.

Pellets can be produced from liquid $CO_2$ in a pelletizer, as it is known, and are easily storable. There may be provision for the supply device to convey already prefabricated pellets to the nozzle device with the aid of a propellant gas. It is also possible, however, that the supply device has an apparatus for forming carbon dioxide pellets from liquid carbon dioxide and conveys these to the nozzle device by means of a propellant gas. In both instances, the solid carbon dioxide emerges from the nozzles of a nozzle device and passes into the engine to be cleaned.

The technique for the production of $CO_2$ flakes and pellets is described in the document "Carbon Dioxide Blasting Operations" of the US forces. $CO_2$ flakes occur when liquid and/or gaseous $CO_2$ emerges from a nozzle due to the evaporation cold of the emerging $CO_2$. Pellets have a higher density than flakes and are obtained, for example, by a compaction of solid $CO_2$ (for example, flakes) in a pelletizer or the like.

As compared with water, carbon dioxide has the advantage as a cleaning medium that it can be used at any desired outside temperatures, that is to say even at temperatures of below 5° C. It can therefore be employed throughout the year. Moreover, the carbon dioxide flakes sublimate completely after some time, and there are therefore no residues in the engine. Owing to the protective layer referred to, caused by the gas escaping from the flakes, the carbon dioxide flakes also have no abrasive action, as does, for example, coal dust as an already known cleaning medium. On the contrary, the cleaning action occurs essentially due to thermal effects. On account of the heat/cold stresses induced by the carbon dioxide flakes, the impurities are detached from the surfaces of the engine parts. The detached dirt is either blown out of the engine by means of the airstream already present in the dry cranking mode, but in the latest when the engine is started for the first time after cleaning with carbon dioxide.

As mentioned, no residues which could be detrimental to operation remain in the engine after cleaning with carbon dioxide, since the carbon dioxide flakes or pellets are sublimated completely. The operation of the engine and therefore of the entire aircraft is even more reliable due to the absence of possible residues and, consequently, of a possible source of disturbance or faults.

The supply device makes the cleaning medium available (for example, in one or more tanks) and may be provided with operating and drive devices, pumps, energy accumulators or the like. It is preferably designed as a mobile, in particular traveling unit.

The nozzle device has one or more nozzles for the cleaning medium. When liquid carbon dioxide is used, the nozzles are preferably designed such that the formation of flakes when carbon dioxide emerges through the nozzles is promoted. The nozzle device may in this case either be set up separately from the engine or else be fastened to the engine or its components. The supply device and the nozzle device are connected to one another via a line connection. This line connection serves, in particular, for feeding the cleaning medium (which is preferably under pressure and, if appropriate, is cooled) to the nozzles of the nozzle device. The line connection is preferably flexible and may, in particular, have an, if appropriate, pressure-resistant hose.

The nozzle device of the apparatus according to the invention may thus be positioned upstream of a turbofan or of the compression stages of an engine such that the flakes being produced at the nozzles or pellets pass into the engine. In this case, the momentum which the flakes have after the carbon dioxide emerges from the nozzles may be sufficient. However, there may also be provision for the jet engine to move in the dry cranking mode, and for the air draft through the engine thus occurring to promote the distribution of the solid carbon dioxide. Moreover, the rotation of the engine in the dry cranking mode can ensure that the cleaning medium flows around all the parts of the engine. A comprehensive cleaning can thus be ensured.

In an engine with a secondary stream, that is to say with a turbofan, the nozzle device may be designed, by the orientation of the nozzles, such that the cleaning medium is introduced particularly into the compressor stages. The cleaning medium is then carried from the compressor stages further on into the combustion chamber and the turbine stages. Contamination in said components has serious effects on the efficiency of the overall engine. A thorough cleaning particularly of these engine components is therefore important.

The nozzle device has one or more nozzles. It is particularly preferred if the nozzle device has at least two nozzles. The sprayed area can thereby be enlarged, and the entire surface of the turbofan or of the compressor stages can be swept.

It is particularly preferred if the nozzle device has means for rotationally fixed connection to the shaft of the turbofan and/or of the compressor stages of the jet engine and if a rotary coupling between the nozzle device and the line connection is provided. By means of the rotationally fixed connection to the shaft, the nozzle device can corotate during dry cranking, that is to say during the slow turning of the engine without the injection of kerosene. Particularly when flat-jet nozzles are used, as is preferred, it can thus be ensured that the cleaning medium is distributed uniformly in the entire engine.

In order to achieve as high a cleaning action as possible, the nozzles are preferably designed as flat-jet nozzles. In this case, it is preferred if the jet plane of the nozzles in the region of their outlet orifice points essentially in the radial direction of the jet engine, that is to say is spanned by two axes, one of which points in the radial direction. The flat jet can thereby sweep particularly effectively over the entire surface of the compressor stages during dry cranking.

It is preferable, further, that the jet plane forms an angle of incidence with the axis of rotation. This means that the jet direction is not parallel to the axis of rotation, but forms an angle with this axis. The jet direction deviates from the axial direction by the amount of this angle. It is preferable if this angle is governed by the set angle of the turbofan or of the front compressor stage. The front compressor stage is, as a rule, a non-rotating stator stage which, with a suitable setting of the jet angle in relation to its set angle, can partially be swept through by the flat jet, so that a more effective cleaning of the compressor stages lying behind it occurs.

The term "rotary coupling" between the nozzle device and line connection is to be understood in a functional sense and designates any device which is suitable for making a sufficiently stable, preferably pressure-resistant and liquid-tight connection between the stationary part of the line connection and the nozzle device corotating with the fan. The purpose of the rotary coupling is to conduct the cleaning medium out of the stationary supply device into the corotating nozzle device and then to cause it to emerge from the nozzles.

There may be provision for the nozzle device to be fastened to the turbofan such that its nozzles point through between the blades of the turbofan. The directly cleaning of the compressor stages and subsequently the combustion chamber or turbine stages is thereby achieved. The nozzles corotating during dry cranking in this case sweep the first compressor stage uniformly over the entire circumference. The cleaning medium is in this case not subjected to any impairment by the turbofan arranged in front of it in the direction of flow, and the spraying direction of the cleaning medium can therefore be adapted to the angle of incidence of the blades of the first compressor stage. In the case of fixed arrangements of the nozzles in front of the turbofan, a substantial part of the cleaning medium impinges onto the blades of the turbofan and therefore cannot, or at least not directly, contribute to the cleaning of the compressor stages. The preferred embodiment is based on the recognition that the directly cleaning of the compressor stages, the combustion chamber and of the turbine stages is essential for the desired improvement in the thermodynamic efficiency of the overall engine. An additional cleaning of the turbofan which is possibly wanted may in this case be achieved, for example, by means of manual cleaning or else by the separate spraying of carbon dioxide as the cleaning medium onto the turbofan.

The distribution of the mass of the nozzle device is preferably rotationally symmetrical about its axis of rotation. Thus, when the nozzle device corotates, no appreciable additional unbalance is introduced. For this purpose, the rotary coupling is preferably seated essentially centrically on the axis of rotation of the apparatus according to the invention in the mounted state. The nozzle device preferably has at least two or more nozzles which are distributed preferably rotationally symmetrically about the axis of rotation.

The outlet orifice of the nozzles is preferably arranged in that end region of the nozzle device which points away from the rotary coupling. The rotary coupling is preferably located in the front region of the nozzle device, that is to say that region which, in the mounted state, points upstream, that is to say away from the inlet of the jet engine. The outlet orifice of the nozzles is accordingly provided in the axial end region, pointing away from it, of the nozzle device, that is to say in the downstream end region in the mounted state. This arrangement makes it possible, during mounting on the shaft of the fan of a turbofan engine, either to insert the nozzles through the interspaces of the blades, so that they are arranged directly in front of the first compressor stage, or else to orient them at least in a directing manner such that they spray through the interspaces of the blades of the turbofan directly onto the first compressor stage.

The means for rotationally fixed connection to the shaft of the turbofan of the jet engine preferably comprise fastening means for fastening to the turbofan blades, such as, for example, suitably designed hooks, by means of which the nozzle device can be hooked on the trailing edges (the downstream edges) of the blades of the turbofan.

For rotationally fixed fixing to the shaft in the turbofan, the nozzle device may have a device for essentially positive attachment onto the shaft hub of the fan. To be precise, turbofan engines have, as a rule, on the upstream end of the shaft of the turbofan a conically curved hub which is intended to improve the air inflow behavior. The corresponding means for rotationally fixed connection can be attached onto this hub. The "essentially positive" means in this context that the shape of the shaft hub is utilized for the intended positioning of the nozzle device and for fixing in the desired position. It does not mean that the entire surface of the shaft hub has to be surrounded positively.

For example, the device may have one or more ring parts, by means of which it can be attached onto the shaft hub. In the case of a plurality of ring parts, these have a different diameter which is adapted to the diameter of the shaft hub in the corresponding regions. For example, two axially space-apart rings of different diameter may be provided, by means of which the nozzle device is positioned and centered on the shaft hub.

Guy ropes may be provided preferably for the further fixing. For example, the nozzle device may be centered on the shaft hub of the fan by means of the ring parts and then be braced by means of guy ropes which are fixed to the trailing edge of the turbofan blades. According to the invention, spring devices may be provided for pretensioning the guy ropes, so that the nozzle device is pressed with a defined force onto the shaft hub.

The guy ropes are preferably fastened (for example, by means of hooks) to the turbofan blades, preferably to their trailing edge. The supply device for the cleaning medium preferably has at least one storage tank for the cleaning medium and at least one pump for acting with pressure upon the nozzle device with the cleaning medium. The storage tank is preferably heat-insulated and capable of being acted upon with pressure, so that the carbon dioxide as the cleaning agent can dwell for longer in the storage tank. It is particularly preferable if the storage tank has a cooling device in order to keep the carbon dioxide at the correct temperature.

It is preferable, moreover, if the apparatus is designed such that the method parameters described further below can be set.

The subject of the invention is, furthermore, an arrangement consisting of a jet engine and of an apparatus, as described above, suitable for carrying out a cleaning of the jet engine. The arrangement is defined in that the apparatus suitable for carrying out the cleaning of the jet engine is arranged such that its nozzles are directed onto the intake of the jet engine.

If, in a turbofan engine, the turbofan is not to be cleaned by the cleaning medium from the apparatus, there may preferably be provision whereby the nozzle device is connected fixedly in terms of rotation to the shaft of the fan on the jet engine, the axes of rotation of the fan of the jet engine and of the nozzle device are arranged essentially concentrically, the nozzles of the nozzle device are at a radial distance from the common axis of rotation of the jet engine and of the apparatus which is preferably shorter than the radius of the first compressor stage, and the outlet orifices of the nozzles are arranged behind the plane of the turbofan in the axial direction and/or the nozzles are arranged in the interspaces of the turbofan blades and/or are aligned with interspaces of the turbofan blades, so that the nozzle jets can pass, essentially unimpeded, through the plane of the turbofan.

Preferably, the set angle of the jet planes of the nozzles with the axis of rotation is adapted to the set angle of the compressor stage blades located at the front in the direction of flow of the engine. The cleaning action in the rear compressor stages or the combustion chamber and the turbine stages is thereby improved.

The subject of the invention is, furthermore, a method for cleaning a jet engine by means of a cleaning agent, the cleaning agent used being solid carbon dioxide.

It is particularly preferable if the method is carried out using the apparatus described above. In this case, the method preferably has the following steps:
a) mounting of the nozzle device so that the outlet orifice of the nozzles are directed onto the inlet of the jet engine;
b) rotation of the jet engine;
c) action upon the nozzle device with cleaning medium and cleaning of the jet engine.

There may also be provision for the nozzle device to be mounted on the hub of the fan of the jet engine so that the outlet orifices of the nozzles are directed onto the first compressor stage.

The dry cranking or rotation of the jet engine during the cleaning operation preferably takes place at a rotational speed of 50 to 500 rev/min, preferably of 100 to 300 rev/min, further preferably of 120 to 250 rev/min. A rotational speed of between 150 and 250 rev/min is particularly preferred. Cleaning may also take place during the idling of the engine. The rotational speed then preferably amounts to 500 to 1500 rev/min.

The duration of the cleaning operation preferably amounts to 1 to 15 min, further preferably to 2 to 10 min, further preferably to 3 to 7 min.

BRIEF DESCRIPTION OF THE DRAWINGS

An exemplary embodiment of the invention is explained below with reference to the drawings in which.

DETAILED DESCRIPTION OF THE INVENTION

Figure 1:
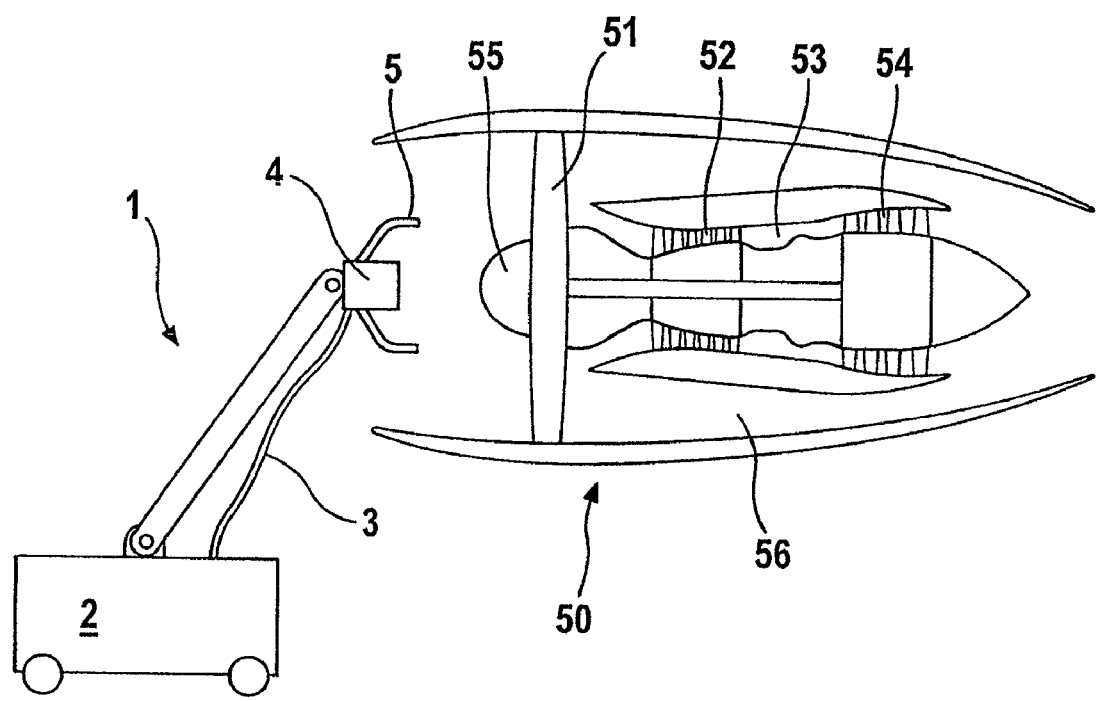
FIG. 1 shows a first apparatus according to the invention for cleaning a jet engine.

FIG. 1 illustrates a first apparatus 1 according to the invention for cleaning a jet engine 50.

The jet engine 50 is an engine with turbofan 51 and is illustrated as such diagrammatically. The engine 50 has, in addition to the turbofan 51, also a plurality of compressor stages 52, a combustion chamber 53 and turbine stages 54. Moreover, a shaft hub 55 is provided which is connected fixedly in terms of rotation to a turbofan. Part of the airstream, which passes through the turbofan 51 when the engine 50 is in operation, passes into the compressor stages 52 and subsequently into the combustion chamber 53 and the turbine stages 54; another part is conducted past these components in a secondary stream duct 56.

The apparatus 1 according to the invention consists of a supply device 2 comprising a tank for the cleaning medium which is suitable for storing liquid carbon dioxide, of a cooling device for cooling this tank and a pump. By means of the pump, the cleaning medium can be pumped through a line connection 3 to the nozzle device 4. The nozzle device 4 has two nozzles 5 through which the cleaning agent can emerge.

The cleaning agent used is liquid carbon dioxide in which flakes are formed shortly after it emerges from the nozzles. These flakes pass into the engine and because of their low temperature release the dirt from the components of the engine as a result of induced cold/heat stresses. The engine may in this case rotate in the dry cranking mode. Owing to the airstream thereby occurring, the carbon dioxide flakes are distributed in the entire engine. Moreover, the released dirt can thus be blown out of the engine to the rear and captured there. Since the solid carbon dioxide is completely sublimated after some time, no residues remain behind in the engine. The released dirt also no longer has to be separated from the cleaning medium, but can be disposed of immediately.

The nozzles 5 of the nozzle device 4 may be oriented such that the solid carbon dioxide passes mainly into the compressor stages 52 and not into the secondary stream duct 56.

Figure 2:
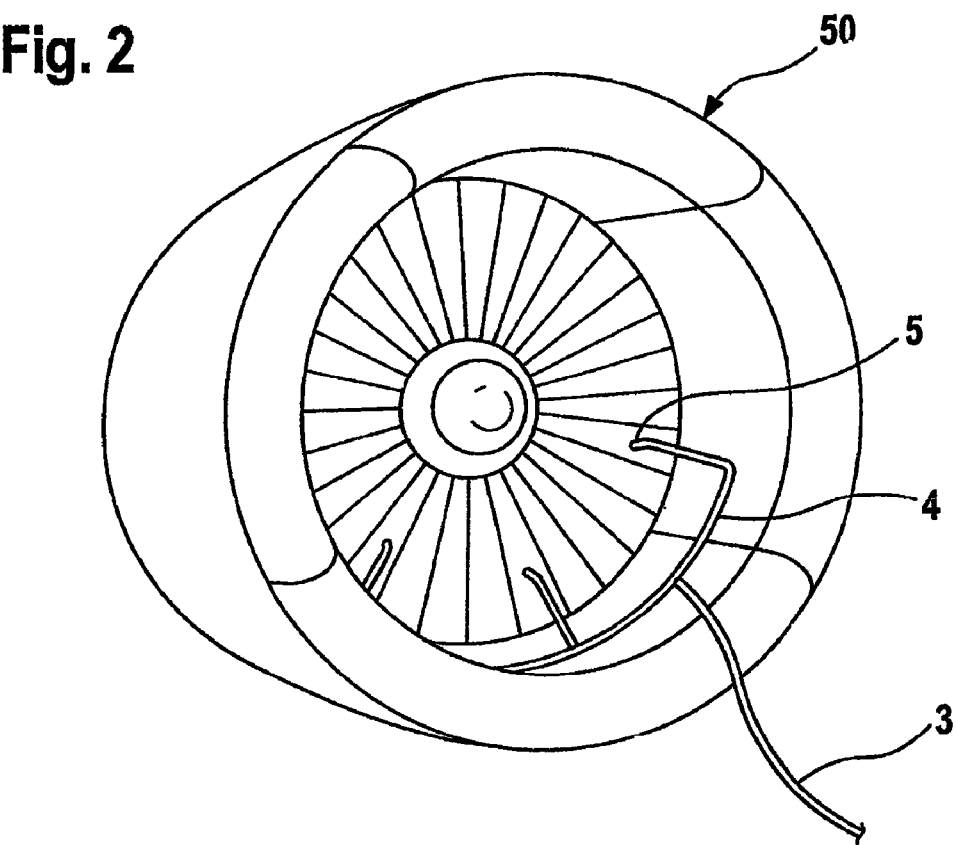
FIG. 2 shows a second apparatus according to the invention for cleaning a jet engine.

FIG. 2 shows a second apparatus according to the invention for cleaning a jet engine 50. Here, the nozzle device 4 is fastened directly to the engine 50. It is supplied with the cleaning medium via the line 3 by the supply device, not illustrated. The cleaning medium employed here is carbon dioxide pellets which are kept in stock in the supply device, not illustrated, and are sprayed out of the nozzles 5 of the nozzle device 4 with the aid of a propellant gas. The apparatus from FIG. 2 is otherwise identical to the apparatus from FIG. 1, and therefore reference is made to the statements given above.

Figure 3:
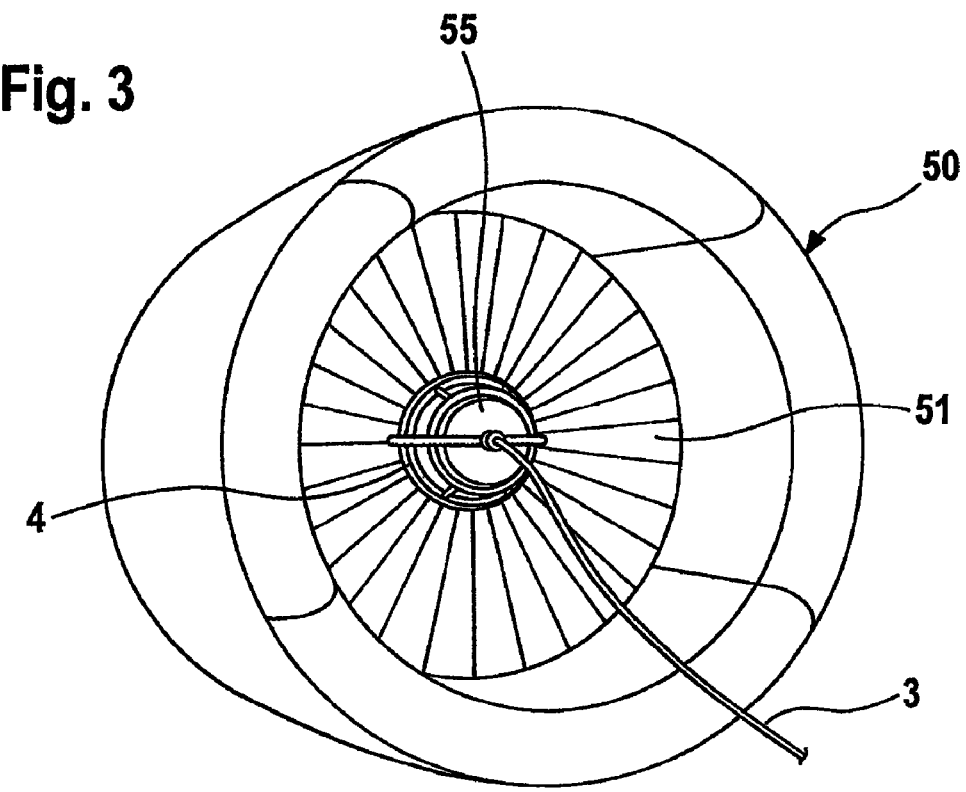
FIG. 3 shows a third apparatus according to the invention for cleaning a jet engine.

The apparatus for cleaning a jet engine 50 in FIG. 3 has a nozzle device 4 which is connected fixedly in terms of rotation to the shaft hub 55 of the turbofan 51. The nozzle device 4 is supplied with carbon dioxide as the cleaning medium via the line 3 from the supply device, not illustrated. The nozzle device 4 is explained in more detail with reference to the following figures.

Figure 4:
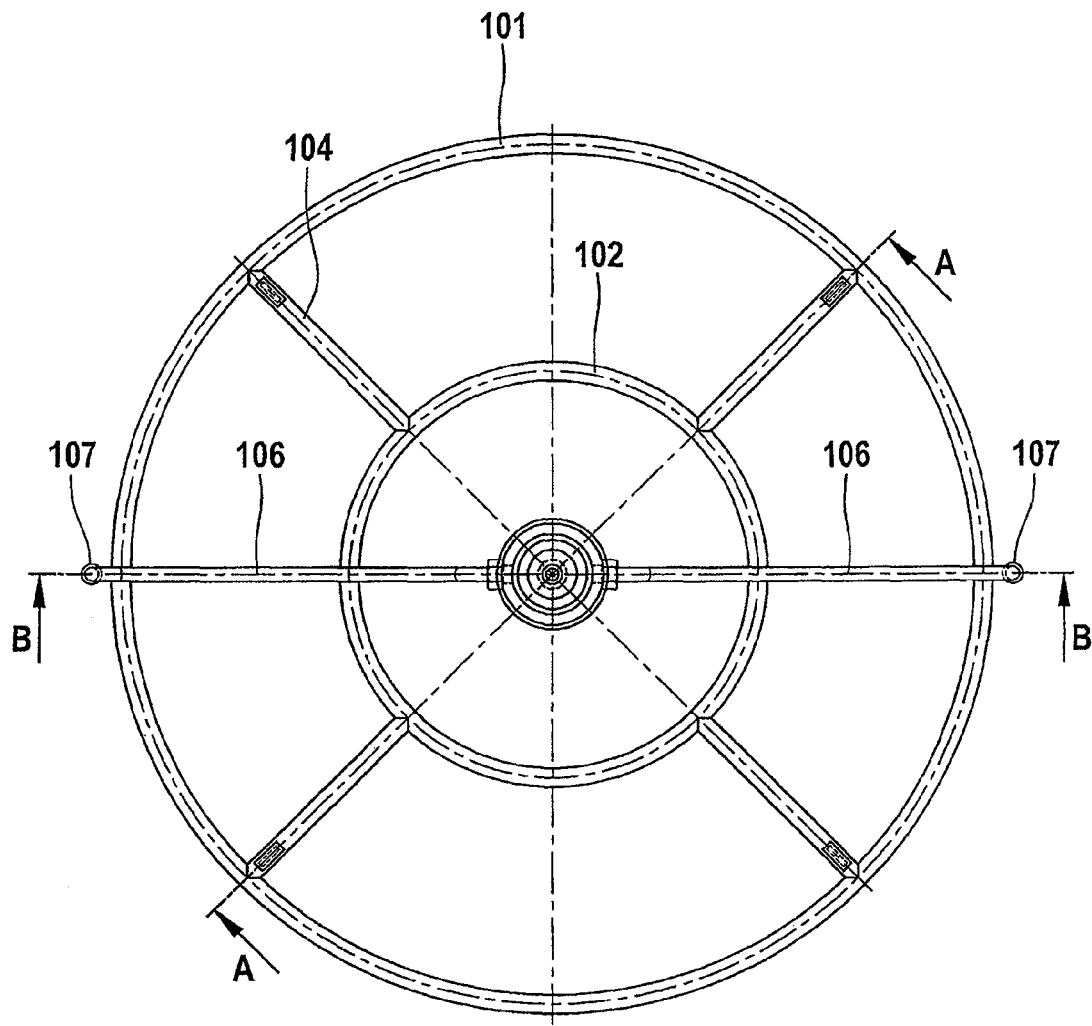
FIG. 4 shows a view of the nozzle device from FIG. 3.
Figure 5:
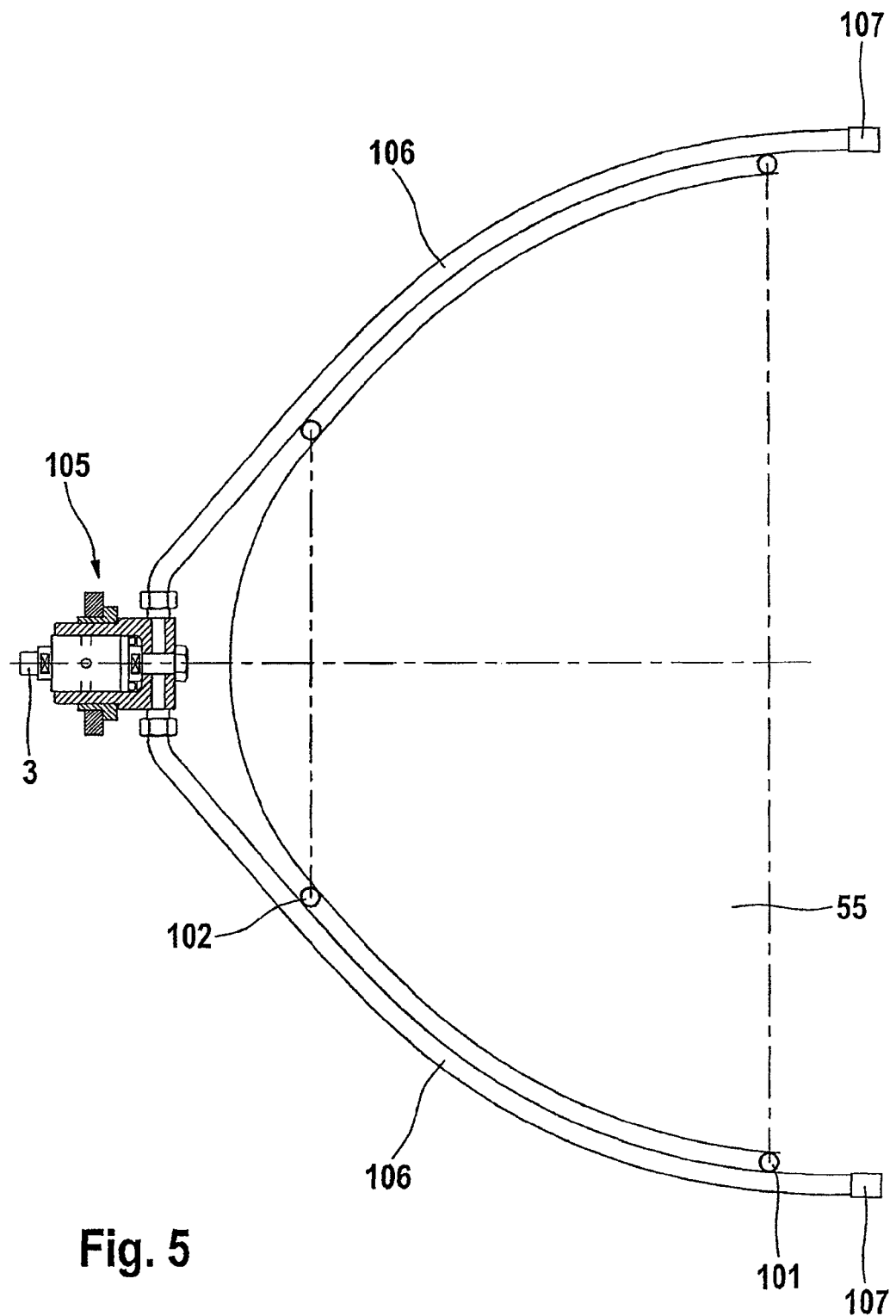
FIG. 5 shows a section through the plane B-B of FIG. 4 of a nozzle device which is attached onto the shaft hub of a turbofan.
Figure 6:
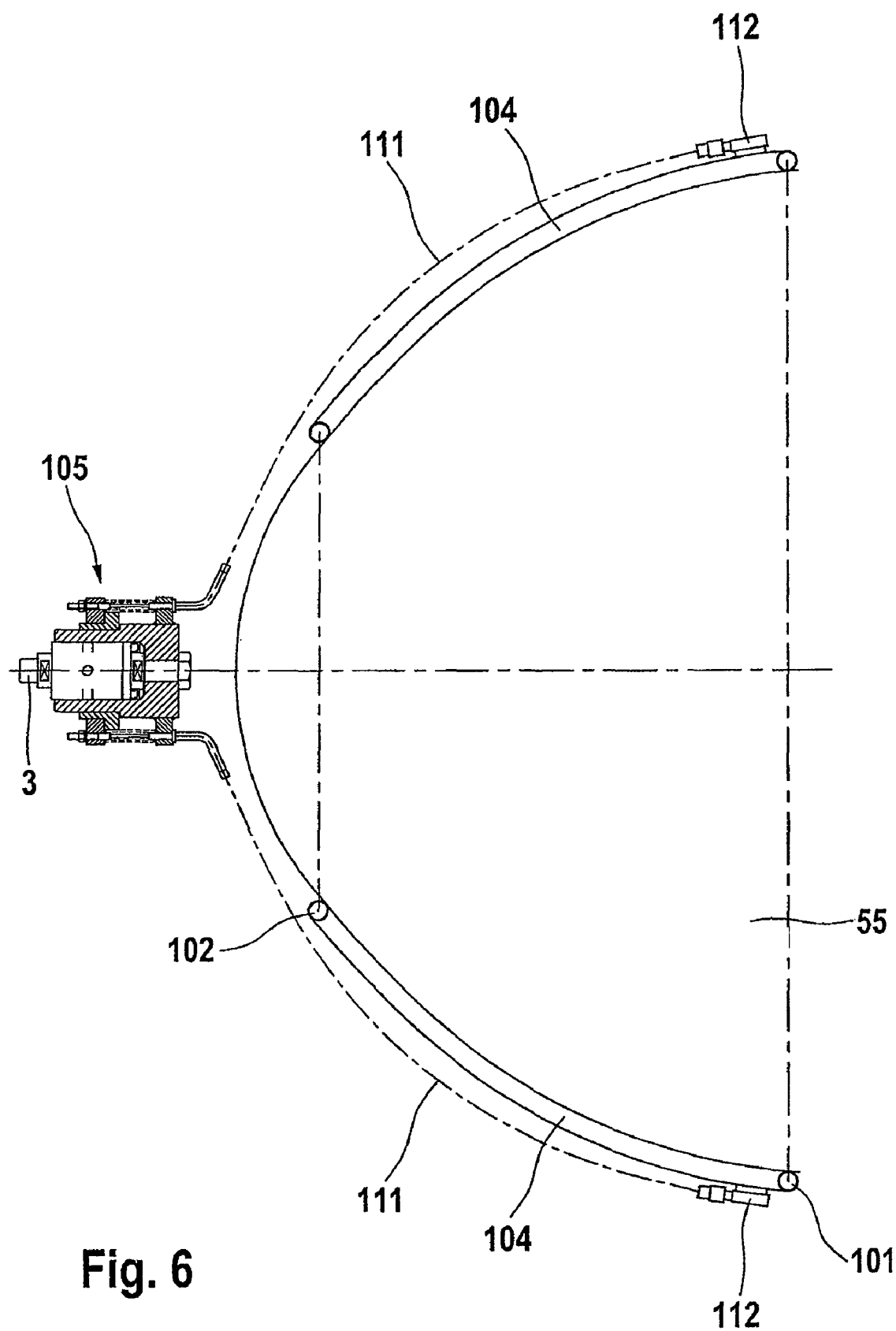
FIG. 6 shows a section through the plane B-A of FIG. 4 of a nozzle device which is attached onto the shaft hub of a fan.
Figure 7:
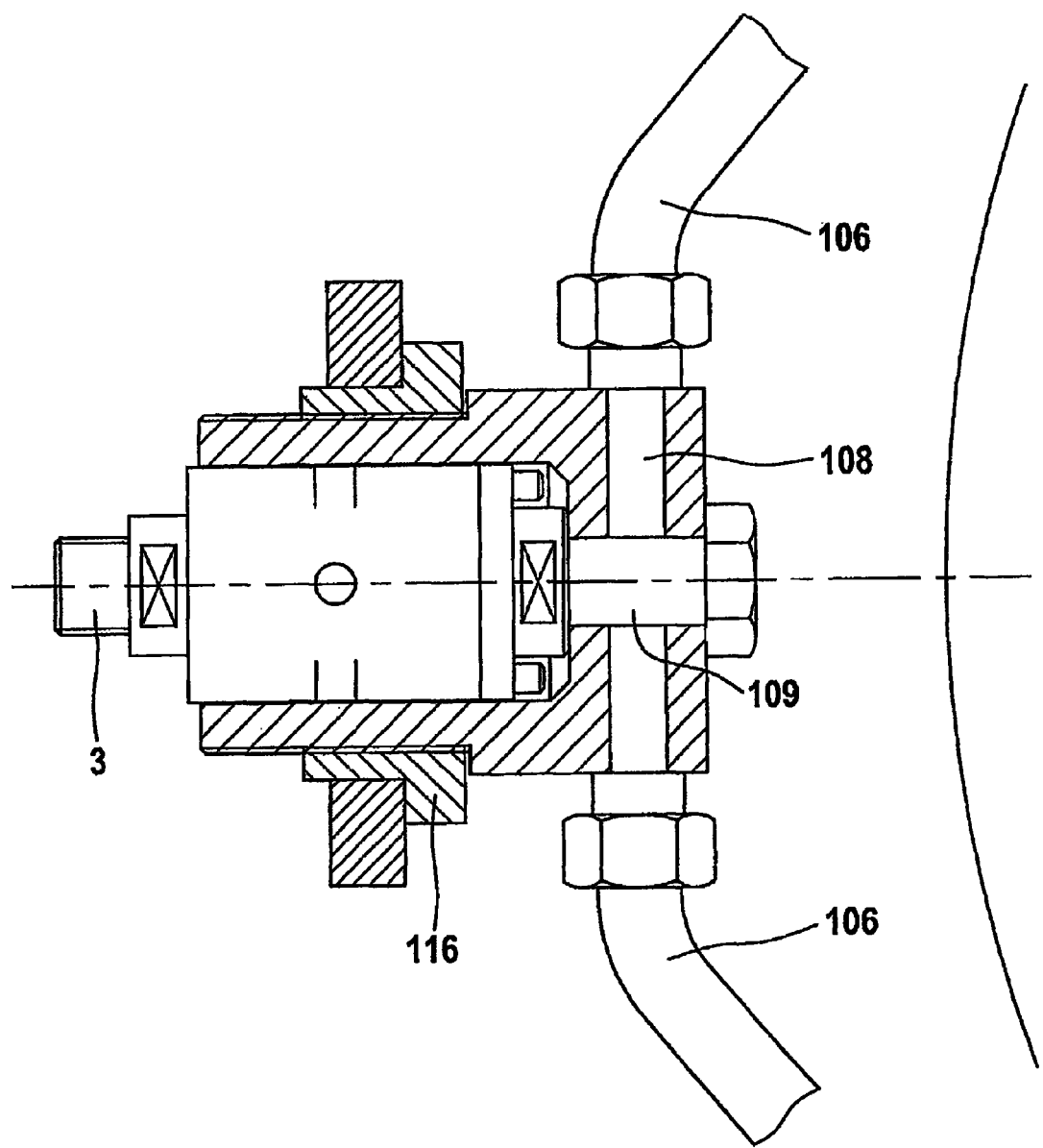
FIG. 7 shows a detail of the rotary coupling from FIG. 5.

The nozzle device in FIG. 4 has two ring elements 101, 102, with the aid of which the nozzle device is attached onto a shaft hub 55 of the turbofan 51 of a jet engine 50 (see FIGS. 3, 5 and 6). In the attached state, the ring elements 101, 102 surround the shaft hub 55 essentially positively. The two ring elements 101, 102 are connected to one another by means of radial struts 104. Arranged at the upstream tip of the nozzle device (with respect to the direction of flow of the engine) is arranged a rotary coupling, designated as a whole by 105. From this rotary coupling 105 extend two delivery lines 106 which lead radially outward and which feed two flat-jet nozzles 107 with cleaning medium. In the view of FIG. 7 showing a detail, it can be seen that the two delivery lines 106 are liquid-connected via radial ducts 108 and an axial duct 109 of the rotary coupling 105 to a feed line 3 which connects the rotary coupling 105 to the supply unit, not illustrated in the drawing.

The delivery lines 106 are fixed at the intersection points with the ring elements 101, 102 to these ring elements and are therefore part of the carrying structure of the overall nozzle device 4.

Figure 8:
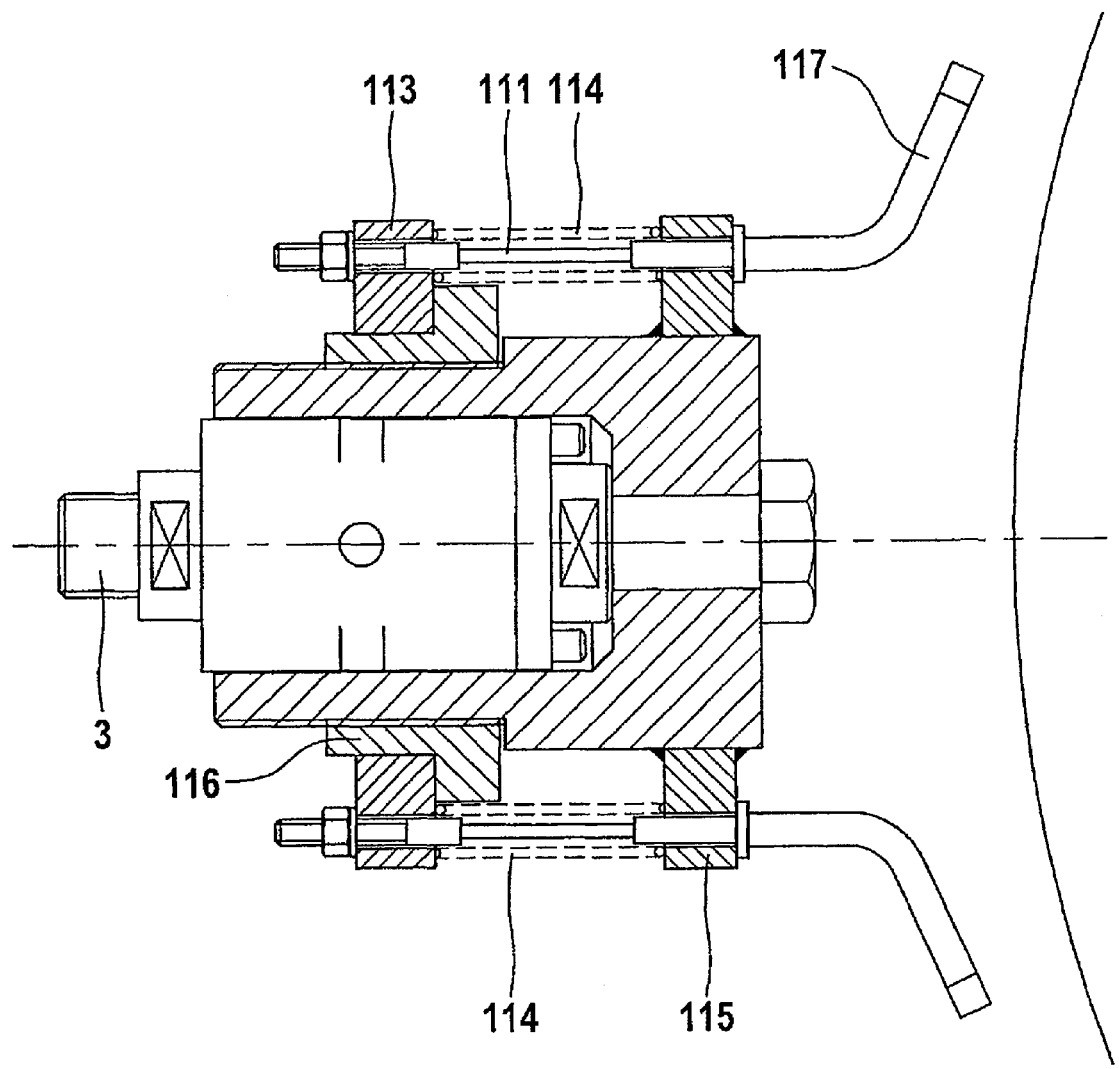
FIG. 8 shows a detail of the rotary coupling from FIG. 6.

For fastening the nozzle device 4 to the shaft hub 55 of the turbofan 51, guy ropes, indicated at 111, are provided, which are hooked on the trailing edges of the turbofan blades by means of the hooks 112. As can be seen in FIG. 8, the guy ropes 111 are led, via guy rope guides 117 fastened to the rotary coupling, to the rotary coupling and are fastened there to an axially displaceable tension ring 113. Compression springs 114 are supported on an annular shoulder 115 of the rotary coupling and exert on the tension ring 113 a force acting in the direction away from the annular shoulder 115. In the attached state, the compression springs 114 exert a prestress on the guy ropes 111 and consequently ensure that the nozzle device is fixed to the hub 55 of the turbofan 51. The tension ring 113 is moved upstream by means of a tension nut 116 which is seated on a thread of the coupling housing 118. As a result, a tension force is transmitted to the guy ropes 111, and therefore a secure connection of the nozzle device to the hub of the fan is made.

For cleaning the compressor stages 52, the combustion chamber 53 and the turbine stages 54 of a jet engine 50 with a turbofan 51, the nozzle device 4 is attached onto the shaft hub 55 of the turbofan 51 in the way which can be seen particularly from FIGS. 5 and 6 and is fixed to the blades of the turbofan 51 by means of the hooks 112. The engine is set in rotation (dry cranking). The flat-jet nozzles 107 are fed with cleaning medium from the supply device, not illustrated, via the connecting line 3, the rotary coupling 105 and the delivery lines 106. This cleaning medium sweeps the inlet of the first compressor stage over its entire circumference and thus carries out the cleaning.

The invention claimed is:

1. An apparatus for cleaning a jet engine, comprising:
a supply device configured to make a cleaning medium available;
a nozzle device configured to introduce the cleaning medium into the jet engine, the nozzle device comprising a rotationally fixed connection configured to connect to a shaft of a turbofan of the jet engine;
a line connection between the supply device and the nozzle device; and
a rotary coupling provided between the nozzle device and the line connection, wherein the cleaning medium comprises solid carbon dioxide.

2. The apparatus of claim 1, wherein the solid carbon dioxide is in the form of carbon pellets.

3. The apparatus of claim 1, wherein the solid carbon dioxide is in the form of carbon flakes.

4. The apparatus of claim 1, wherein the nozzle device is configured to introduce the cleaning medium into compressor stages of the jet engine.

5. The apparatus of claim 1, wherein the nozzle device comprises at least two nozzles.

6. The apparatus of claim 1, wherein the distribution of mass of the nozzle device is rotationally symmetrical about an axis of rotation of the nozzle device.

7. The apparatus of claim 1, wherein nozzles of the nozzle device are flat-jet nozzles.

8. The apparatus of claim 7, wherein a jet plane in a region of an outlet orifice of the nozzles points essentially in a radial direction of the jet engine.

9. The apparatus of claim 7, wherein a jet plane forms an angle of incidence with an axis of rotation of the jet engine.

10. The apparatus of claim 7, wherein outlet orifices of the nozzles are arranged in an axial end region of the nozzle device which points away from an axis of rotation of the nozzle device.

11. The apparatus of claim 1, wherein the rotationally fixed connection to the shaft of the turbofan of the jet engine comprises a fastener for fastening to blades of the turbofan.

12. The apparatus of claim 1, wherein the rotationally fixed connection to the shaft of the turbofan of the jet engine comprises a device for essentially positive attachment onto a shaft hub of the turbofan.

13. The apparatus of claim 12, wherein the device for essentially positive attachment onto the shaft hub of the turbofan comprises at least one ring part and guy ropes.

14. The apparatus of claim 13, wherein spring devices are provided for prestressing the guy ropes.

15. The apparatus of claim 13, wherein a fastener is provided for fastening the guy ropes to blades of the turbofan.

16. The apparatus of claim 1, wherein the supply device comprises at least one storage tank for the cleaning medium and at least one pump for acting with pressure upon the nozzle device with the cleaning medium, the storage tank being capable of at least one of being acted upon with pressure and being heat-insulated.

17. The apparatus of claim 16, wherein the storage tank comprises a cooling device.

18. A system comprising:
a jet engine; and
an apparatus according to claim 1 for cleaning the jet engine,
wherein the apparatus is arranged such that nozzles of the nozzle device are directed onto an intake of the jet engine so that the cleaning medium passes into the jet engine.

19. The system of claim 18, wherein:
the nozzle device is connected fixedly in terms of rotation to a shaft of a turbofan of the jet engine;
the axis of rotation of the turbofan of the jet engine and the axis of rotation of the nozzle device are arranged essentially concentrically along a common axis of rotation;
the nozzles of the nozzle device are at a radial distance from the common axis of rotation, the radial distance being shorter than a radius of an inlet orifice of a first compressor stage; and
outlet orifices of the nozzles are arranged behind a plane of the turbofan in the axial direction and/or the nozzles are arranged in interspaces of blades of the turbofan and/or the nozzles are aligned with interspaces of the blades of the turbofan so that nozzle jets can pass, essentially unimpeded, through the plane of the turbofan.

20. The system of claim 19, wherein a jet plane of the nozzles forms an angle of incidence with the axis of rotation which corresponds essentially to an angle of incidence of the blades of a front compressor stage in a direction of flow of the jet engine.

* * * * *